UNITED STATES PATENT OFFICE 2,265,159

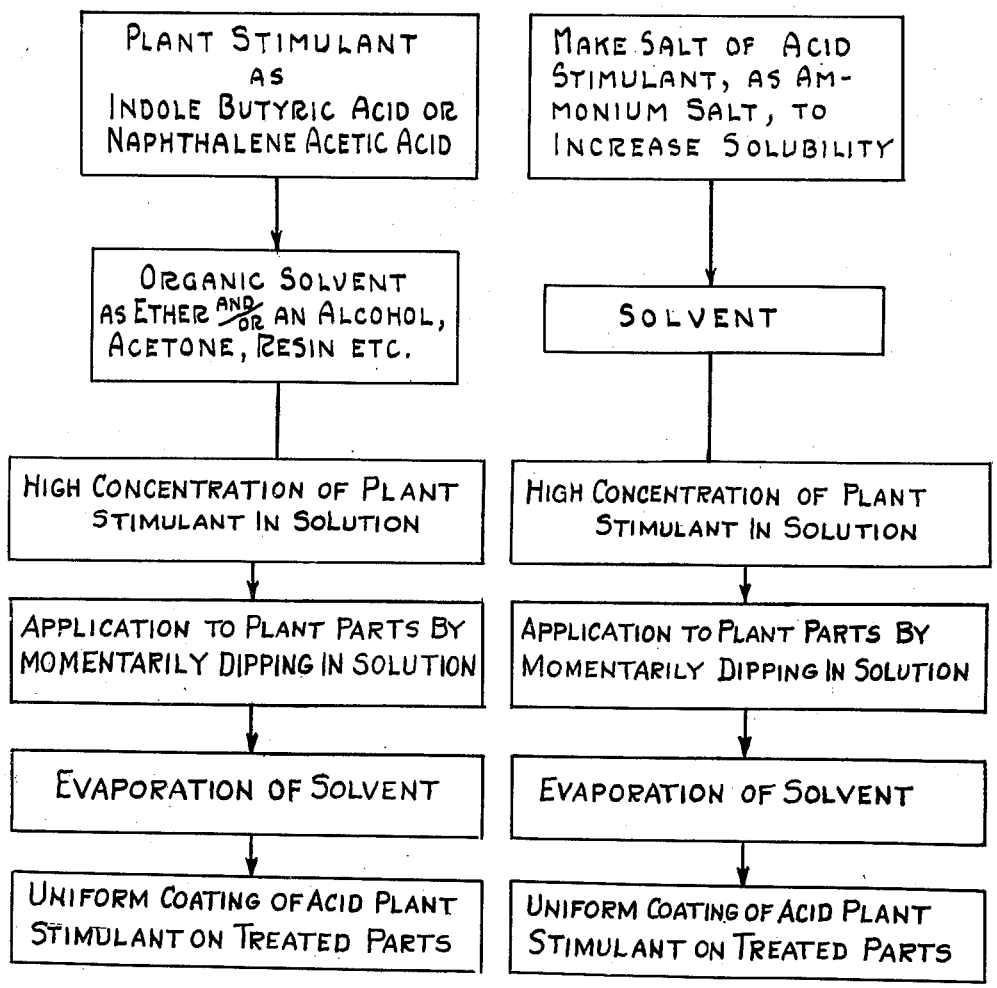

APPLICATION OF PLANT STIMULANTS

Ernest F. Grether, Midland, Mich., assignor to The Dow Chemical Company, Midland, Mich., a corporation of Michigan Application April 26, 1938, Serial No. 204,476

2 Claims. (Cl. 47—58)

This invention relates to forming solutions of plant stimulants, and more particularly to the formation of solutions containing a high concentration of plant stimulants, and to the method of applying the same.

Hitherto, plant stimulants have usually been applied to plants in aqueous solutions or in the form of a lanolin paste. As many of these active compounds, such as indole acetic acid and naphthalene acetic acid, are only slightly soluble in water, it is impossible to obtain high concentrations of these stimulants in an aqueous solution when it is desired to apply such concentrations to plants. For this reason when an aqueous solution is used, a lengthy period of time is required to permit the stem of the treated plant to absorb a sufficient quantity of the stimulant.

Although it is true that these stimulants can be incorporated at any desired strength in lanolin, the use of this paste is not very desirable, especially when it is desired to apply the stimulants to plant cuttings.

Moreover, although high concentrations of plant stimulants may be dissolved in various organic solvents, it has been found that not many of these organic solvents are suitable for this treatment, because they affect the treated plant part in an undesirable way.

One of the objects of this invention is to avoid the above-mentioned disadvantages of the prior art.

Another object of this invention is to provide organic solvents, in which high concentrations of plant stimulants are readily soluble, the use of which will not unfavorably affect the plant.

Still another object of my invention is to provide organic solvents in which high concentrations of plant stimulants can be obtained and which will evaporate when applied to the plant.

Yet another object of my invention is to provide a method of applying solutions of stimulants to plants in such a manner that a uniform coating is formed about the treated parts.

A further object of my invention is to provide a method of obtaining high concentrations of plant stimulants in a solvent by increasing the solubility of these plant stimulants.

Figs. 1 and 2 of the drawing show flow sheets illustrative of my invention.

I have found that high concentrations of plant stimulants, such an indole butyric acid and naphthalene acetic acid, may be prepared by dissolving the selected plant stimulant or a mixture of these stimulants in certain organic solvents, such as an ether solution, or ether in connection with an alcohol, such as methanol, acetone, resin, or the like.

In practicing one form of my invention the desired concentration is first obtained, and the part of the plant to be treated is then dipped in the solution. After its removal and exposure to the air, the solvent evaporates almost immediately leaving a deposit of the stimulant on the treated surface. This deposit is in the form of a closely adhering coating of stimulants, which due to their concentration will immediately begin to penetrate the treated part of the plant in appreciable quantities. If any organic substance which will produce a film, such as resin, cellulose acetate, ethyl cellulose, benzene or benzene-acetone mixtures are used in connection with the solvent, the substance, upon the evaporation of the remaining ingredients which compose this solvent, will cause a more uniform coating of the stimulant about the treated part. The formation of such a coating or deposit enables the stimulant, in the presence of water, to quickly penetrate into the cutting. Such a treatment is especially suitable to use with hard wood cuttings. If desired, the film forming substance may be employed without the use of any of the other solvents previously mentioned.

From the above description it is believed apparent that, by the use of these organic solvents and by applying this method of treating the plant parts, any desired concentration of stimulants can be applied to the plants, and the time of treatment can, therefore, be reduced to a minimum. In this manner the plants can be treated rapidly, and a wide variety of concentrations may be used.

In another form of my invention I have provided means of increasing the concentration of acid plant stimulants in an aqueous solution by forming salts of these acid stimulants. For instance, 3-indole butyric acid is only slightly soluble in water, but the salts of this acid are sufficiently soluble to form a high concentration of the salt in a water solution. While various salts of these acid solutions may be used, I have found that ammonium salts of these acid stimulants are especially desirable. By the use of these acid salts the concentration may be increased as desired, and therefore the time of treatment shortened. This method of increasing the solubility of acid salts corresponds to the aging of liquid manure, during which process indole acetic acid is converted into its ammonium salt during the decomposition of the urea, which is one of the ingredients.

The following examples are given for purposes of illustration and are not intended to limit the invention in any way.

Methanol, acetone, ethyl ether, benzene, methyl and ethyl acetates—low boiling (below 80° C.) organic solvents which evaporate quickly when exposed to air—are suitable as carriers for root stimulants, either singly or in mixtures. The stimulant is dissolved at the rate of from 1:100 to 1:1000 in these solvents; the cuttings are dipped in and immediately taken out of the solution and exposed to the air or an air current. The solvent evaporates very rapidly and leaves a coat of stimulant on the cutting as far as it was dipped into the solution. The cutting is then placed into moist sand; the moisture slowly dissolves the stimulant and gives it a chance to penetrate into the cutting. To produce a film coating, a natural or artificial resin, such as cellulose acetate, ethyl cellulose, or the like, is added to the solvent in various concentrations which may range from 1/10% to 1% and more. The solvent dissolves the stimulant and the resin. The cuttings are dipped in the solution for a moment and when exposed to the air the evaporating solvent leaves on the cutting surface a film containing the stimulant. During the rooting period the moisture in the sand enables the stimulant to penetrate into the cutting.

Example 1

1 g. of naphthalene acetic acid is dissolved in 500 cc. methanol, the cuttings are dipped into the solution and immediately removed. Within a short time the methanol is evaporated and the stimulant covers uniformly the surface of the cutting. Ether, benzene, etc. solutions will do the same.

When naphthalene acetic acid is used in aqueous solution, the highest concentration possible is slightly over 0.4 g. in 1000 cc. water at room temperature; and cuttings, especially hardwood cuttings, had to be left in a solution of this concentration from two hours to 24 hours and longer, depending on the nature of the cutting.

Example 2

Indole butyric acid to the extent of 1.0 g. is dissolved in a solution of 4 g. cellulose acetate in 1000 cc. of an acetone-benzene solution 1:2. Cuttings are dipped in this solution and taken out immediately. In the air the solvent evaporates and leaves a film coating on the dipper part of the cutting.

Example 3

1 g. of indole butyric acid ammonium salt is dissolved in 20 cc. of water. This solution is diluted with methanol to 1000 cc.

Example 4

1 g. ammonium salt of naphthalene acetic acid is dissolved in 5 cc. of water; 200 g. methanol is added. This solution is diluted with 800 cc. of an equal mixture of acetone and benzene containing 5 g. of pine wood resin.

All these solutions may be used in more concentrated or more dilute forms. Any inert, organic solvent with high volatility and low boiling point is usable. Solvent mixtures are preferable when resinous substances are used for coating.

While for purposes of illustration I have disclosed specific organic substances and one method of applying these substances, it is obvious that many other chemically related substances may be used and the procedure varied without departing from the spirit of my invention. I, therefore, intend that this invention be only limited by the prior art and the scope of the appended claims.

I claim:

1. A method of depositing an acid plant stimulant on a selected portion of a plant in such concentration as to form an approximately continuous coating of the plant stimulant on the treated part consisting of forming a soluble salt of a naphthalene or indole substituted aliphatic acid, dissolving a sufficient quantity of the said salt in a volatile solvent to form a solution of high concentration, applying the concentrated solution to the selected portion of the plant, and contacting the treated portion with air to promote evaporation of the solvent.

2. A method of depositing an acid plant stimulant on a selected portion of a plant in such concentration as to form an approximately continuous coating of the plant stimulant on the treated part consisting of dissolving a sufficient quantity of a member of the class consisting of the indole and naphthalene substituted aliphatic acids and their soluble salts in a volatile solvent to form a solution of high concentration, applying the concentrated solution to the selected portion of the plant, and contacting the treated portion with air to promote evaporation of the solvent.

ERNEST F. GRETHER.